(12) United States Patent
Rogers et al.

(10) Patent No.: US 10,849,192 B2
(45) Date of Patent: *Nov. 24, 2020

(54) ENCLOSURE ASSEMBLY FOR WINDOW ELECTRICAL CONNECTIONS

(71) Applicant: AGC Automotive Americas R&D, Inc., Ypsilanti, MI (US)

(72) Inventors: Eric Rogers, Belleville, MI (US); Christopher A. Imeson, Belle River, CA (US); William C. Schuch, Adrian, MI (US)

(73) Assignee: AGC Automotive Americas R&D, Inc., Ypsilanti, MI (US)

( * ) Notice: Subject to any disclaimer, the term of this patent is extended or adjusted under 35 U.S.C. 154(b) by 566 days.

This patent is subject to a terminal disclaimer.

(21) Appl. No.: 15/498,001

(22) Filed: Apr. 26, 2017

(65) Prior Publication Data
US 2018/0317282 A1 Nov. 1, 2018

(51) Int. Cl.
*H05B 3/06* (2006.01)
*H05B 3/84* (2006.01)
(Continued)

(52) U.S. Cl.
CPC ........... *H05B 3/06* (2013.01); *B60R 16/0215* (2013.01); *B60R 16/0222* (2013.01); *B60S 1/026* (2013.01);
(Continued)

(58) Field of Classification Search
None
See application file for complete search history.

(56) References Cited

U.S. PATENT DOCUMENTS

| 2,644,066 A | 6/1953 | Glynn |
| 2,709,211 A | 5/1955 | Glynn |

(Continued)

FOREIGN PATENT DOCUMENTS

| CA | 2835381 A1 | 11/2012 |
| CN | 102420266 A | 4/2012 |

(Continued)

OTHER PUBLICATIONS

EP1139697A2, Ledoussal et al, Oct. 2001, "Window with Feed Connector," partial translation. (Year: 2001).*

*Primary Examiner* — Joseph M Pelham
(74) *Attorney, Agent, or Firm* — Quinn IP Law

(57) ABSTRACT

Systems and methods for environmentally sealing electrical connections of window assemblies are disclosed. A mechanically protective enclosure assembly is adhered to a transparent pane including glass. The enclosure assembly includes a first member, a second member, and an opening. The first member includes a transparent-pane engaging surface, a first interface surface, and a plurality of first walls extending therebetween. The second member is attached to the first member. The second member includes a top member, a second interface surface, and a plurality of second walls extending therebetween. The first interface surface engages the second interface surface to provide a first fluid-tight seal. The opening is defined by at least one of the plurality of first walls and at least one of the plurality of second walls. The opening engages the wiring harness to provide a second fluid-tight seal therebetween.

20 Claims, 7 Drawing Sheets

(51) Int. Cl.
| | |
|---|---|
| *E06B 7/12* | (2006.01) |
| *B60S 1/02* | (2006.01) |
| *B60R 16/02* | (2006.01) |
| *H01R 101/00* | (2006.01) |
| *H01R 13/52* | (2006.01) |

(52) U.S. Cl.
CPC ............... *E06B 7/12* (2013.01); *H05B 3/84* (2013.01); *H01R 13/5216* (2013.01); *H01R 2101/00* (2013.01); *H01R 2201/02* (2013.01); *H01R 2201/26* (2013.01); *H05B 2203/013* (2013.01); *H05B 2203/016* (2013.01)

(56) References Cited

U.S. PATENT DOCUMENTS

| | | | |
|---|---|---|---|
| 3,324,543 A | 6/1967 | McVey | |
| 3,390,969 A | 7/1968 | Sullivan et al. | |
| 3,568,012 A | 3/1971 | Ernst et al. | |
| 3,657,802 A | 4/1972 | Lunetiers | |
| 3,736,649 A | 6/1973 | Bristow | |
| 3,789,192 A | 1/1974 | Spindler | |
| 3,795,041 A | 3/1974 | Hennicke et al. | |
| 3,900,593 A | 8/1975 | Herczog et al. | |
| 3,926,357 A | 12/1975 | Matrisian | |
| 4,024,613 A | 5/1977 | Martel et al. | |
| 4,531,044 A | 7/1985 | Chang | |
| 4,546,409 A | 10/1985 | Yoshino et al. | |
| 4,589,584 A | 5/1986 | Christiansen et al. | |
| 4,707,591 A | 11/1987 | Sprenger | |
| 4,763,828 A | 8/1988 | Fukaya et al. | |
| 4,769,622 A | 9/1988 | Leavitt | |
| 4,782,209 A | 11/1988 | Caers et al. | |
| 4,918,288 A | 4/1990 | Carter et al. | |
| 4,925,421 A | 5/1990 | van den Broek | |
| 4,925,607 A | 5/1990 | Kyle | |
| 4,935,583 A | 6/1990 | Kyle | |
| 5,013,612 A | 5/1991 | Hunt et al. | |
| 5,058,800 A | 10/1991 | Yoshizawa et al. | |
| 5,134,248 A | 7/1992 | Kiec et al. | |
| 5,156,853 A * | 10/1992 | Werner ............... | B29C 73/025 156/285 |
| 5,198,056 A | 3/1993 | Stockli et al. | |
| 5,208,444 A * | 5/1993 | Winter ............ | B32B 17/10036 219/203 |
| 5,229,070 A | 7/1993 | Melton et al. | |
| 5,229,613 A | 7/1993 | Pandelisev et al. | |
| 5,270,517 A | 12/1993 | Finley | |
| 5,288,006 A | 2/1994 | Otsuka et al. | |
| 5,350,105 A | 9/1994 | Delalle et al. | |
| 5,354,392 A | 10/1994 | Santo et al. | |
| 5,368,814 A | 11/1994 | Gonya et al. | |
| 5,415,944 A | 5/1995 | Kazem-Goudarzi et al. | |
| 5,427,865 A | 6/1995 | Mullen, III et al. | |
| 5,429,293 A | 7/1995 | Bradley, III et al. | |
| 5,454,506 A | 10/1995 | Jordhamo et al. | |
| 5,540,379 A | 7/1996 | Kazem-Goudarzi et al. | |
| 5,543,601 A | 8/1996 | Bartrug et al. | |
| 5,626,483 A | 5/1997 | Naitoh | |
| 5,735,446 A | 4/1998 | White et al. | |
| 5,738,270 A | 4/1998 | Malmgren | |
| 5,738,554 A | 4/1998 | Borger et al. | |
| 5,798,031 A | 8/1998 | Charlton et al. | |
| 5,837,960 A | 11/1998 | Lewis et al. | |
| 5,857,259 A | 1/1999 | Johnston | |
| 5,881,944 A | 3/1999 | Edwards et al. | |
| 5,986,208 A | 11/1999 | Taylor et al. | |
| 5,995,293 A | 11/1999 | Derkits, Jr. et al. | |
| 6,039,238 A | 3/2000 | Panaghe | |
| 6,039,616 A | 3/2000 | Pereira et al. | |
| 6,042,932 A | 3/2000 | Ingles et al. | |
| 6,103,034 A | 8/2000 | Fujiwara et al. | |
| 6,103,998 A | 8/2000 | Kuno et al. | |
| 6,103,999 A | 8/2000 | Nishio et al. | |
| 6,123,588 A | 9/2000 | Johnston | |
| 6,217,373 B1 | 4/2001 | Johnston | |
| 6,229,221 B1 | 5/2001 | Kloen et al. | |
| 6,253,986 B1 | 7/2001 | Brofman et al. | |
| 6,253,988 B1 | 7/2001 | Pereira | |
| 6,307,515 B1 | 10/2001 | Sauer et al. | |
| 6,319,461 B1 | 11/2001 | Domi et al. | |
| 6,359,540 B1 | 3/2002 | Spiller et al. | |
| 6,396,026 B2 | 5/2002 | Gillner et al. | |
| 6,428,367 B1 | 8/2002 | Costa | |
| 6,534,720 B2 | 3/2003 | Von Alpen et al. | |
| 6,774,315 B1 | 8/2004 | Pierson et al. | |
| 6,816,385 B1 | 11/2004 | Alcoe | |
| 6,834,969 B2 | 12/2004 | Bade et al. | |
| 6,861,991 B2 | 3/2005 | Mueller et al. | |
| 6,872,465 B2 | 3/2005 | Soga et al. | |
| 6,878,246 B2 | 4/2005 | Latvaitis et al. | |
| 6,893,799 B2 | 5/2005 | Danovitch et al. | |
| 6,902,098 B2 | 6/2005 | Dautartas | |
| 7,010,856 B2 | 3/2006 | Suda et al. | |
| 7,134,201 B2 | 11/2006 | Ackerman et al. | |
| 7,180,031 B1 * | 2/2007 | Loibl ..................... | H05B 3/06 219/203 |
| 7,223,695 B2 | 5/2007 | Zhong et al. | |
| 7,270,548 B2 | 9/2007 | Jenrich et al. | |
| 7,370,982 B2 | 5/2008 | Bauer et al. | |
| 7,510,401 B2 | 3/2009 | Humpston et al. | |
| 7,708,593 B1 | 5/2010 | Gherardini et al. | |
| 7,780,058 B2 | 8/2010 | Yao et al. | |
| 7,833,070 B2 | 11/2010 | Lyon | |
| 7,838,954 B2 | 11/2010 | Buchwalter et al. | |
| 7,972,710 B2 | 7/2011 | Pereira | |
| 8,077,100 B2 | 12/2011 | Baranski | |
| 8,092,621 B2 | 1/2012 | Ho et al. | |
| 8,109,782 B2 | 2/2012 | Ziegler et al. | |
| 8,157,158 B2 | 4/2012 | Gruber et al. | |
| 9,272,371 B2 | 3/2016 | Hoepfner | |
| 10,374,330 B1 * | 8/2019 | Bennett ............ | H01R 13/2414 |
| 2001/0030185 A1 | 10/2001 | Schnabel et al. | |
| 2002/0004325 A1 | 1/2002 | Pereira et al. | |
| 2002/0111081 A1 | 8/2002 | Machado | |
| 2003/0121906 A1 | 7/2003 | Abbott et al. | |
| 2003/0155467 A1 | 8/2003 | Petrenko | |
| 2004/0237302 A1 | 12/2004 | Antaya et al. | |
| 2005/0035090 A1 | 2/2005 | Johnson | |
| 2005/0195488 A1 | 9/2005 | McCabe et al. | |
| 2005/0221538 A1 | 10/2005 | Suzuki et al. | |
| 2005/0269121 A1 | 12/2005 | Ikeda et al. | |
| 2006/0056003 A1 | 3/2006 | Tonar et al. | |
| 2007/0037004 A1 | 2/2007 | Pereira | |
| 2007/0045002 A1 * | 3/2007 | Jenrich ................. | H01R 4/023 174/520 |
| 2007/0105412 A1 | 5/2007 | Hoepfner et al. | |
| 2007/0117475 A1 | 5/2007 | Tu | |
| 2007/0224842 A1 | 9/2007 | Hoepfner et al. | |
| 2007/0231594 A1 | 10/2007 | Pereira | |
| 2008/0175748 A1 | 7/2008 | Pereira | |
| 2009/0077797 A1 | 3/2009 | Berghofer et al. | |
| 2010/0035072 A1 | 2/2010 | Watanabe et al. | |
| 2010/0326983 A1 | 12/2010 | Sitterlet et al. | |
| 2011/0220704 A1 | 9/2011 | Liu et al. | |
| 2011/0244252 A1 | 10/2011 | Loh | |
| 2011/0268985 A1 | 11/2011 | Zhang et al. | |
| 2012/0048349 A1 | 3/2012 | Metin et al. | |
| 2012/0091113 A1 | 4/2012 | Bennett et al. | |
| 2012/0117880 A1 | 5/2012 | Lahnala et al. | |
| 2012/0273043 A1 | 11/2012 | Lochtefeld et al. | |
| 2012/0298416 A1 | 11/2012 | Ziegler et al. | |
| 2012/0305311 A1 | 12/2012 | Jenrich | |
| 2013/0043066 A1 | 2/2013 | Cholewa et al. | |
| 2013/0045647 A1 * | 2/2013 | Jenrich ................. | H05B 3/86 439/884 |
| 2013/0062119 A1 * | 3/2013 | Schlarb ............ | B32B 17/10036 174/75 R |
| 2013/0121874 A1 | 5/2013 | Ueshima et al. | |
| 2013/0269990 A1 * | 10/2013 | Jenrich ................. | B32B 17/061 174/255 |
| 2014/0199115 A1 | 7/2014 | de Avila Ribas et al. | |

(56) References Cited

U.S. PATENT DOCUMENTS

| | | | |
|---|---|---|---|
| 2016/0204522 A1 | 7/2016 | Bennett et al. | |
| 2016/0204524 A1 * | 7/2016 | Bennett | H01R 4/02 439/86 |
| 2018/0287294 A1 * | 10/2018 | Imeson | H01R 4/023 |

FOREIGN PATENT DOCUMENTS

| | | |
|---|---|---|
| DE | 3604437 A1 | 8/1987 |
| DE | 19536131 C1 | 1/1997 |
| DE | 19536181 A1 | 4/1997 |
| EP | 0248030 A1 | 12/1987 |
| EP | 0262699 A1 | 4/1988 |
| EP | 0426303 A2 | 5/1991 |
| EP | 0581610 A1 | 2/1994 |
| EP | 0869531 A2 | 10/1998 |
| EP | 1058349 A1 | 12/2000 |
| EP | 1139697 A2 | 1/2001 |
| EP | 1488972 A1 | 12/2004 |
| EP | 1657964 A1 | 5/2006 |
| EP | 1493207 B1 | 2/2007 |
| EP | 3382819 A1 | 10/2018 |
| FR | 1104595 A | 11/1955 |
| FR | 2893189 A1 | 5/2007 |
| GB | 1228451 A | 4/1971 |
| GB | 2192023 B | 1/1990 |
| JP | S62172676 A | 7/1987 |
| JP | H05329931 A | 12/1993 |
| JP | H0714662 A | 1/1995 |
| JP | H1040977 A | 2/1998 |
| JP | 2002134254 A | 5/2002 |
| JP | 2007018981 A | 1/2007 |
| WO | 8703290 | 6/1987 |
| WO | 1998016943 A1 | 4/1998 |
| WO | 1998047200 A1 | 10/1998 |
| WO | 2004068643 A1 | 8/2004 |
| WO | 2006128203 A1 | 12/2006 |
| WO | 2011039057 A1 | 4/2011 |
| WO | 2015023921 A1 | 2/2015 |

* cited by examiner

ENCLOSURE ASSEMBLY FOR WINDOW ELECTRICAL CONNECTIONS

INTRODUCTION

The disclosure relates to the field of window assemblies, and, more specifically, to enclosure assemblies for window electrical connections.

Window assemblies used in, for example, vehicles and buildings can be functionalized to include an electrical conductor disposed on a surface of a transparent pane. The electrical conductor can provide any desirable electrical function such as heating the transparent pane or acting as an antenna. The electrical conductor can be, for example, a printed silver circuit. Power can be transferred from a power source to the electrical conductor through a wiring harness coupled to the electrical conductor. The wiring harness includes an electrical connection element bonded to the electrical conductor. The terminal can be bonded to the electrical conductor using an electrically conductive joint such as a solder joint.

Because of their use in vehicles and buildings, the electrically conductive joint can be exposed to the elements. This exposure produces corrosion, weakening, and failure of the solder joint, which prevents power from being transferred to the electrical conductor through the solder joint.

Encapsulant materials have been used to directly cover the solder joint. These materials include the application of epoxies as a direct covering to the joint. Differences in coefficients of thermal expansion of the solder joint, the transparent pane, and the polymeric encapsulation, however, can create mechanical stress on the assembly. When the transparent pane is a glass pane, the glass pane is prone to cracking. The mechanical stress may also delaminate the electrical conductor from the transparent pane, separate the solder joint from electrical connection with a portion of the electrical conductor, or crack the solder joint.

Another drawback of direct polymeric encapsulation includes exposure of the solder joint to the elements. Water routinely penetrates through the polymeric encapsulant to contact the electrical conductor near the solder joint. Water contacting the electrical conductor near the solder joint is slow to evaporate because the water is sheltered by the encapsulant. As such, the water may corrode the electrical conductor or the solder joint, thereby degrading performance of the electrical conductor or rendering the electrical conductor inoperable.

SUMMARY

It is desirable to provide a window assembly that reduces mechanical stress on the components and electrical joints to avoid the above-discussed drawbacks. It is also desirable to provide a window assembly that reduces ingress of water to the electrical joint. According to systems and method of the present disclosure, fluidically-sealed enclosure assemblies are provided to reduce and/or eliminate these drawbacks. The enclosure assemblies substantially reduce mechanical stress imparted on the electrical joint, and the fluidic seal around the electrical joint provided by the enclosure assembly reduces or eliminates water-catalyzed corrosion of the electrical joint.

According to aspects of the present disclosure, a window assembly includes a transparent pane, an electrical conductor disposed on the transparent pane, a wiring harness configured to energize the electrical conductor, an electrical joint between the wiring harness and the electrical conductor, and a mechanically protective enclosure assembly adhered to the transparent pane. The transparent pane includes glass. The mechanically protective enclosure assembly and the transparent pane define an internal volume therebetween. The electrical joint is disposed within the internal volume and spaced from the enclosure assembly. The enclosure assembly includes a first member, a second member, and an opening. The first member includes a transparent-pane engaging surface, a first interface surface, and a plurality of first walls extending therebetween. The transparent-pane engaging surface is adhered to the transparent pane. The second member is attached to the first member. The second member includes a top member, a second interface surface, and a plurality of second walls extending therebetween. The first interface surface engages the second interface surface to provide a first fluid-tight seal. The opening is defined by at least one of the plurality of first walls and at least one of the plurality of second walls. The opening engages the wiring harness to provide a second fluid-tight seal therebetween. The first fluid-tight seal and the second fluid-tight seal provide a fluidic barrier about the electrical joint.

According to aspects of the present disclosure, a method of environmentally sealing an electrical joint disposed on a transparent pane includes adhering a first member of an enclosure assembly to the transparent pane including glass, placing the wiring harness within a first portion of an opening, attaching a second member of the enclosure assembly to the first member, and forming, in response to attaching the second member to the first member, a fluidic barrier between the opening and the wiring harness to inhibit ingress of water into a volume defined by the first member, the second member, and the transparent pane. The first member defines the first portion of the opening for engaging the wiring harness; the second member defines the second portion of the opening for engaging the wiring harness. The volume includes an electrical joint disposed therein. An electrical conductor is disposed on the transparent pane, and the electrical conductor is coupled to the wiring harness through the electrical joint.

According to aspects of the present disclosure, a method of environmentally sealing an electrical joint disposed on a transparent pane includes adhering a first member of an enclosure assembly to the transparent pane, wherein the first member defines a first portion of an opening for engaging a wiring harness, forming the electrical joint between the wiring harness and an electrical conductor disposed on the transparent pane, placing the wiring harness within the first portion of the opening, attaching a lower component of a second member to the first member, wherein the lower component defining a second portion of the opening, forming, in response to attaching the lower component of the second member to the first member, a fluid-tight seal between the opening and the wiring harness, and capping the enclosure assembly with an upper component of the second member to define an internal volume between the enclosure assembly and the transparent pane, wherein the internal volume includes the electrical conductor and the electrical joint therein.

The above features and advantages and other features and advantages of the present disclosure are readily apparent from the following detailed description when taken in connection with the accompanying drawings.

BRIEF DESCRIPTION OF THE DRAWINGS

The drawings are illustrative and not intended to limit the subject matter defined by the claims. Exemplary embodiments are discussed in the following detailed description and shown in the accompanying drawings in which:

DETAILED DESCRIPTION

Systems and methods in accord with the present disclosure provide for fluidically sealed enclosure assemblies. The enclosure assemblies engage a portion of a wiring harness to create a fluid-tight seal therebetween. A fluid-tight seal, as used herein, is a seal formed between two components that is configured to inhibit ingress of fluid during at least typical use conditions. For example, a fluid-tight seal in a vehicular context may be one that is configured to resist the ingress of precipitation, spray, splashing, light water jets, ambient humidity, and/or adjacent pooled or standing water such as may collect on surfaces of a vehicle. The enclosure assemblies described herein beneficially reduce mechanical stresses that may be imparted to the enclosed electrical joints, and the provided fluidic barrier reduces or eliminates water-catalyzed corrosion of the electrical joint.

Figure 1:
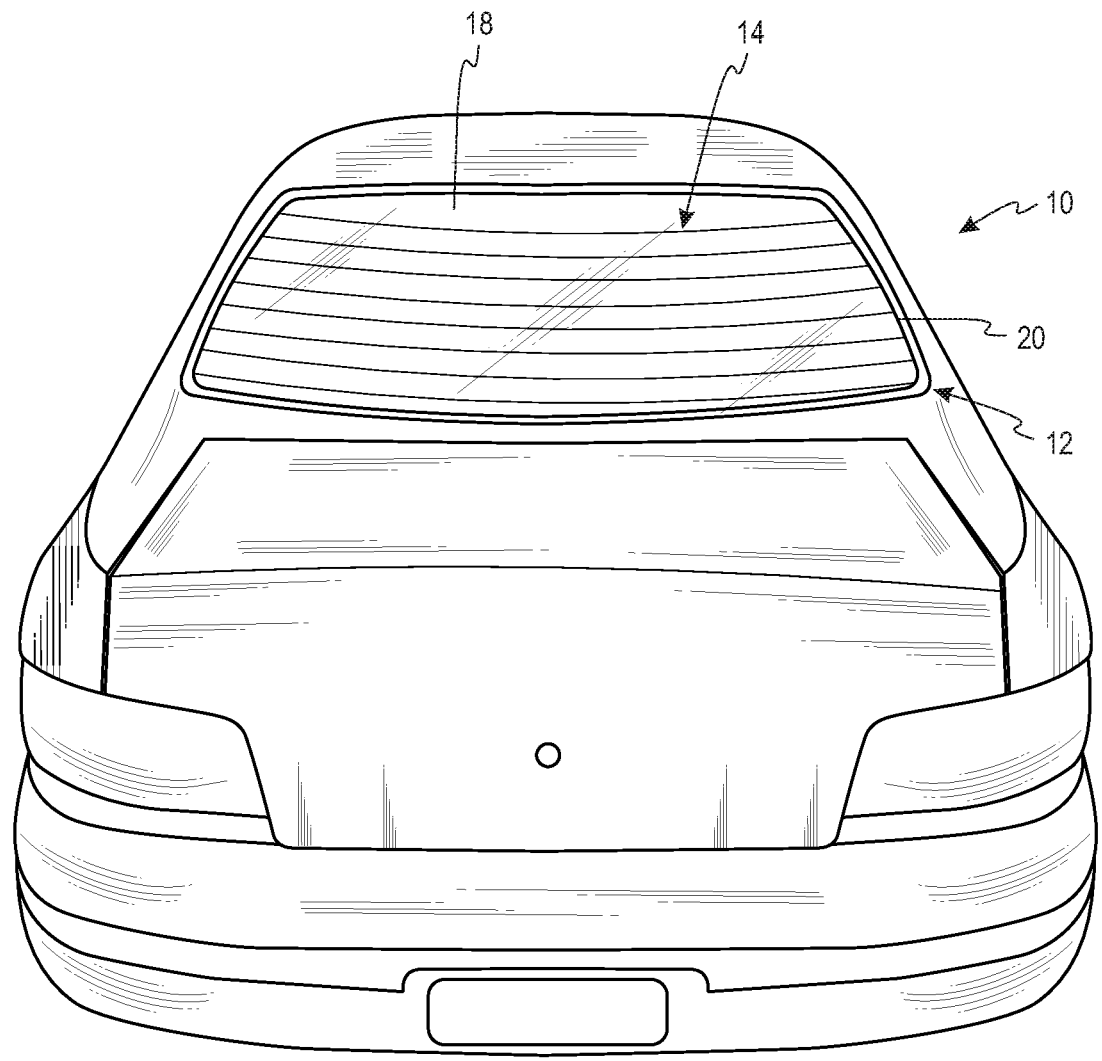
FIG. 1 is a schematic elevational view of a vehicle including a window assembly according to embodiments of the present disclosure.

Referring to FIG. 1, a vehicle 10 including a window assembly 12 is shown according to embodiments of the present disclosure. The window assembly 12 may be, for example, a rear window assembly of a vehicle 10 having a defrost system 14. The window assembly 12 includes a wiring harness 16 (FIG. 4), a transparent pane 18, an electrical conductor 20 attached to the transparent pane 18, and a mechanically protective enclosure assembly 22 (FIG. 2) surrounding a portion of the electrical conductor 20. In some embodiments, the transparent pane 18 is made entirely of glass. In some embodiments, the transparent pane 18 may be a laminate including one or more layers of glass, polymethyl methacrylate, polycarbonate, polyvinyl butyral, polyethyleneterephthalate, combinations thereof, and the like.

The electrical conductor 20 is in electrical communication with one or more working elements that are configured to perform or facilitate a desired function. In the illustrated figures, the working element may include one or more resistive heating elements that are part of the defrost system 14 and are operative to defrost or defog the transparent pane 18 by heating the transparent pane. It is contemplated that the electrical conductor 20 may likewise provide a different desired function requiring electrical connections, such as functioning as an antenna.

In some embodiments, the electrical conductor 20 is made from one or more layers of silver. In other embodiments, the electrical conductor 20 is made from one or more layers of other conductive metals and/or other conductive materials in addition to, or instead of, silver. The electrical conductor 20 may be a film, a coating, and/or any other suitable form. The electrical conductor 20 may be porous, nonporous, or a combination thereof. In some embodiments, the electrical conductor 20 is a porous silver film.

The electrical conductor 20 may be attached to the transparent pane 18 using, for example, fusion, adhesion, physical entrapment, combinations thereof, and the like. In some embodiments, the electrical conductor 20 may be printed onto the transparent pane 18 to produce, for example, a printed silver film or printed silver circuit. In some embodiments, the electrical conductor 20 is disposed on the transparent pane 18 near a peripheral edge of the transparent pane 18. The electrical conductor 20 is often a component of a circuit, such as the defrost system 14, an antenna, a defogger, or the like. The electrical conductor 20 may be integral with the circuit or an extension of the circuit. The electrical conductor 20 may include one or more bus bars (not shown).

Figure 2:
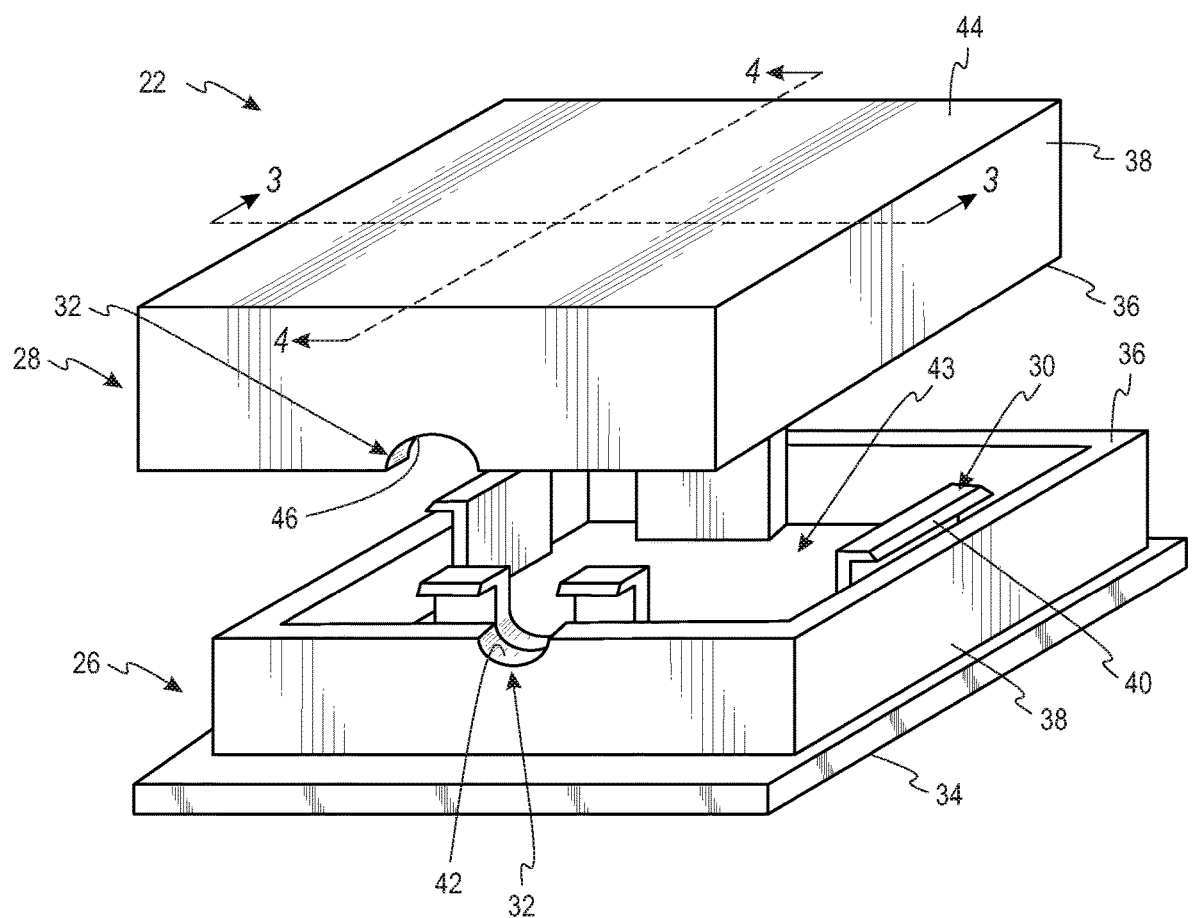
FIG. 2 is a schematic front elevational view of an enclosure assembly for use in the window assembly of FIG. 1 according to embodiments of the present disclosure.

FIG. 2 is a schematic front elevational view of the mechanically protective enclosure assembly 22. The enclosure assembly 22 provides a physical barrier surrounding the electrical joint 24 and prevents contact between the electrical joint 24 (FIG. 4) and components external the enclosure assembly 22. The enclosure assembly 22 can be any geometric shape so long as the geometric shape is sufficient to surround the electrical joint 24, thereby providing a physical barrier. The enclosure assembly 22 may be formed from a polymeric material including thermoplastic polymers, thermoset polymers, combinations thereof, and the like. Non-limiting examples of the polymeric material include silicones, nylons, polybutylene terephthalate, polyvinyl chloride, polyethyleneterephthalate, polycarbonate, polyoxymethylene, and the like.

In some embodiments, such as described in U.S. application Ser. No. 15/472,970 (the '970 Applications), filed Mar. 29, 2017, entitled FLUIDICALLY SEALED ENCLOSURE FOR WINDOW ELECTRICAL CONNECTIONS, which is hereby incorporated by reference in its entirety, the enclosure assembly 22 may be a single piece housing that is directly adhered to the transparent pane 18. In other embodiments, such as illustrated in FIG. 2, the enclosure assembly 22 may have a multi-part construction that includes a first member 26 adhered to the transparent pane, and a second member 28 that is attached to the first member 26 through a mechanical interlock 30. A multi-part design of this nature may have particular utility when the first member 26 also serves other purposes such as securing ancillary components to the transparent pane 18. In some embodiments, for example, the first member 26 may be used to secure an ancillary component such as one or more of a camera, a camera housing, a rear-view mirror, a rain sensor, an exterior antenna housing, a shade mechanism, a trim component, combinations thereof, and/or other similar accessory components that may have utility with the transparent pane 18 and/or the environment in which the transparent pane 18 is utilized. In some embodiments, the second member 26 may be integral to the ancillary component and/or a housing of the ancillary component.

To permit wired access to the electrical joint 24 (e.g., where the ancillary component requires electrical power or communication with external components), an opening 32 is defined between the first member 26 and the second member 28 when the second member 28 is attached to the first member 26. The opening 32 is configured to receive a portion of the wiring harness 16 therethrough. In some embodiments, the opening may be provided entirely through the second member 28 rather than being defined by both the first member 26 and the second member 28. In such an instance, the wiring harness 16 and second member 28 may be received in a pre-assembled state. Therefore, in a general sense, the opening 32 may be at least partially defined by a wall of the second member 28, though in a further embodiment, such as shown in the figures, the opening 32 may be defined by both the first member 26 and the second member 28.

In some embodiments, the opening 32 is configured to engage the received portion of the wiring harness 16 to form a fluid-tight seal therebetween. Engagement of the opening 32 with the wiring harness 16 can form the fluid-tight seal by, for example, compressing, deforming, and/or impinging into a protective insulation layer of the wiring harness 16. In some embodiments, the opening 32 may engage the wiring harness 16 through an intermediary such as a grommet.

The first member 26 includes a transparent-pane engaging surface 34, an interface surface 36, and a plurality of walls 38 extending therebetween. At least one of the plurality of walls 38 of the first member 26 may at least partially define a first portion 42 of the opening 32, extending through the wall 38. The first portion 42 of the opening 32 is configured to engage a respective portion of the received wiring harness 16. In one configuration, the first portion 42 may be approximately one half of the opening 32.

The first member 26 defines an opening/bore 43 through which a portion of the transparent pane and/or the electrical conductor 20 may be exposed. The bore 43 is generally located between the plurality of walls 38 and is configured such that at least a portion of the electrical connection element 56 extends into and/or through the bore 43 (see FIG. 4).

The transparent-pane engaging surface 34 is configured to be adhered to the transparent pane 18 in a manner that forms a substantially fluid-tight seal therebetween. Suitable adhesives are adhesives that provide adhesion to glass, such as pressure-sensitive adhesives, structural bonding tape, urethanes, epoxies, acrylics, silicones, and the like. Optionally, an adhesion promoter or primer can be placed on the transparent pane 18 to improve bonding of the adhesive 40.

In some embodiments, the adhesive may require curing at an elevated temperature and pressure that may prove to be detrimental to ancillary electronic components that are intended to be attached to the first member 26. The present enclosure assembly 22 provides particular benefits in these circumstances by allowing the first member 26 to be completely adhered to the pane 18 prior to formation of the electrical joint and/or attachment of these components. For example, the first member 26 may be attached to the transparent pane 18 and the adhesive may be cured using an autoclave or chemical treatment that would otherwise damage the ancillary components. Thereafter, the ancillary components can be added, electrical connections made, and an environmental barrier formed around the ancillary components.

In forming an effective environmental barrier, the interface surface 36 of the first member 26 is configured to engage with a corresponding interface surface 36 of the second member 28 to form a fluid-tight seal therebetween. While the illustrated interface surfaces 36 are generally planar, the interface surfaces 36 may define any desirable shape to ensure a fluid-tight seal at all portions of the interface. For example, in some embodiments, the interface surfaces 36 define, a tongue-and-groove interface, a nested (concave/convex) hemispherical interface, or a lap joint. Likewise, in some embodiments, a gasket, seal, or O-ring may be used to provide and/or further enhance the fluid seal.

The second member 28 generally includes a top member/surface 44 and a plurality of walls 38 extending therefrom. The walls 38 include and define the corresponding interface surface 36 and are distal to the top member 44. At least one of the plurality of walls 38 defines a second portion 46 of the opening 32 extending through the wall 38. The second portion 46 of the opening 32 is configured to engage a respective portion of the wiring harness 16. In one configuration, the second portion 46 may be approximately one half of the opening 32.

Figure 3:
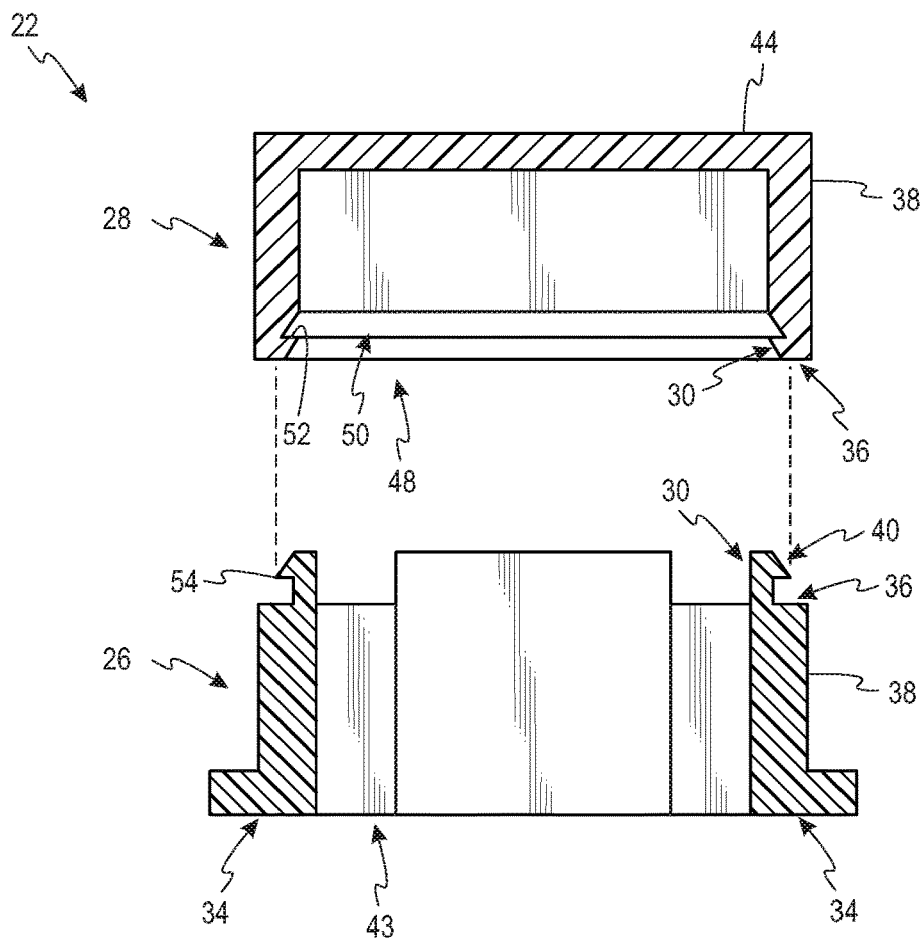
FIG. 3 is a schematic cross-sectional end view of the enclosure assembly of FIG. 2, taken along line 3-3.

FIG. 3 is a schematic end view of the enclosure assembly 22 taken along line 3-3 in FIG. 2. The top member 44 and the plurality of walls 38 define an open cavity 48. The open cavity 48 is configured to provide a desired clearance between the top member 44 and the electrical connection element 56 (FIG. 4) when the enclosure assembly 22.

The plurality of walls 38 of the second member 28 defines a receiving portion 50 of the mechanical interlock 30. The receiving portion 50 is configured to receive the engaging portion 40 therein when the first member 26 is attached to the second member 28. The receiving portion 50 includes a shoulder 52 for contacting a lip 54 of the engaging portion 40. Engagement between the shoulder 52 and lip 54 bias the first member 26 and second member 28 together to form the fluid-tight seal along the interface surfaces 36.

Figure 4:
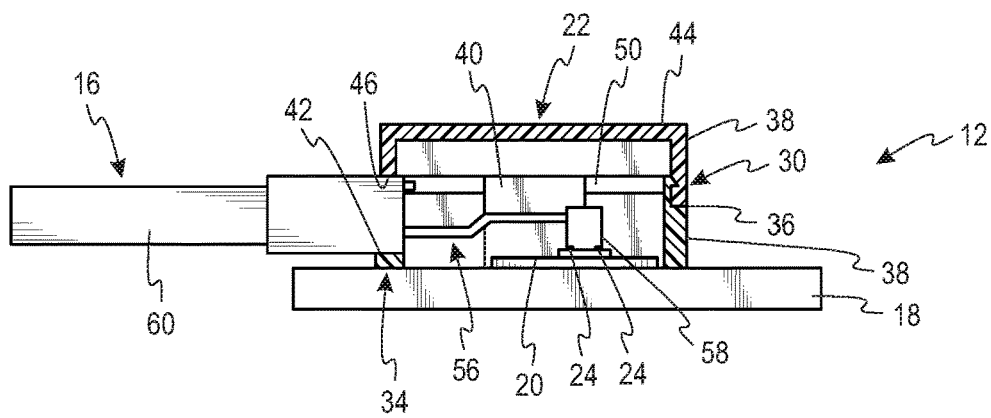
FIG. 4 is a schematic side view of the enclosure assembly of FIG. 2 including portions of the window assembly of FIG. 1 shown in partial cross-section, taken along line 4-4 of FIG. 2.

FIG. 4 is a schematic side view in partial cross-section the window assembly 12. The window assembly 12 includes the wiring harness 16, the transparent pane 18, the electrical conductor 20, and the enclosure assembly 22. The wiring harness 16 is configured to transfer an electric current between the electrical conductor 20 and an external device. In some embodiments, the external device is a power supply and the wiring harness 16 transfers power from the power supply (not shown) to the electrical conductor 20. The wiring harness 16 includes an electrical connection element 56 with a terminal connector 58 and a wire 60 extending therefrom. The terminal connector 58 is disposed at a distal end of the wiring harness 16 and is configured to mechanically engage the electrical conductor 20 attached to the transparent pane 18.

The electrical connection element 56 electrically couples the electrical conductor 20 to the wire 60. The electrical connection element 56 is in electrical communication with the electrical conductor 20 for energizing the electrical conductor 20. The electrical connection element 56 can be formed from copper, copper alloys, silver, silver alloys, combinations thereof, and the like. The electrical connection element 56 may also include iron, molybdenum, tungsten, nickel, hafnium, tantalum, titanium, chromium, iridium, niobium, vanadium, platinum, tin, combinations thereof, and the like in addition to or in place of the copper, copper alloys, silver, and silver alloys. In the illustrated embodiment, the electrical connection element 56 is copper.

In some embodiments, the electrical connection element 56 is both electrically and mechanically coupled with the electrical conductor 20, for example, via an electrical joint 24 that is formed between and/or an external surface of the electrical conductor 20 and the terminal connector 58 using conductive adhesives, films, rubbers, or springs. In some embodiments, the electrical joint 24 is a solder joint made from metals and/or alloys formed from lead, indium, tin, copper, silver, bismuth, germanium, gallium, gold, and/or other conductive metals and non-metals. In some embodiments, the electrical joint 24 is formed from a lead-free solder.

To protect the electrical joint 24 from physical stresses or impacts that may compromise the strength or durability of the mechanical/electrical connection, the physical enclosure assembly 22 is affixed to the transparent pane 18 in a surrounding arrangement about the electrical joint 24. As shown, the enclosure assembly 22 provides a physical barrier surrounding the electrical joint 24 and precludes contact between the electrical joint 24 and components external the enclosure assembly 22. The enclosure assembly 22 can be any geometric shape so long as the geometric shape is sufficient to surround the electrical joint 24, thereby providing a physical barrier. Beneficially, the enclosure assembly 22 also inhibits corrosion of the portion of the electrical conductor 20 disposed therein.

After the enclosure assembly 22 is assembled and adhered to the transparent pane, a volume is defined by the transparent pane 18, walls 38, and top member 44. The transparent pane 18 and the enclosure assembly 22 provide fluid-tight seals that inhibit ingress of water into the enclosure assembly. The fluid-tight seals are produced between the transparent pane 18 and the first member 26, between the interface surfaces 36 of the first member 26 and the second member 28, and between the wiring harness 16 and the opening 32.

Figure 5:
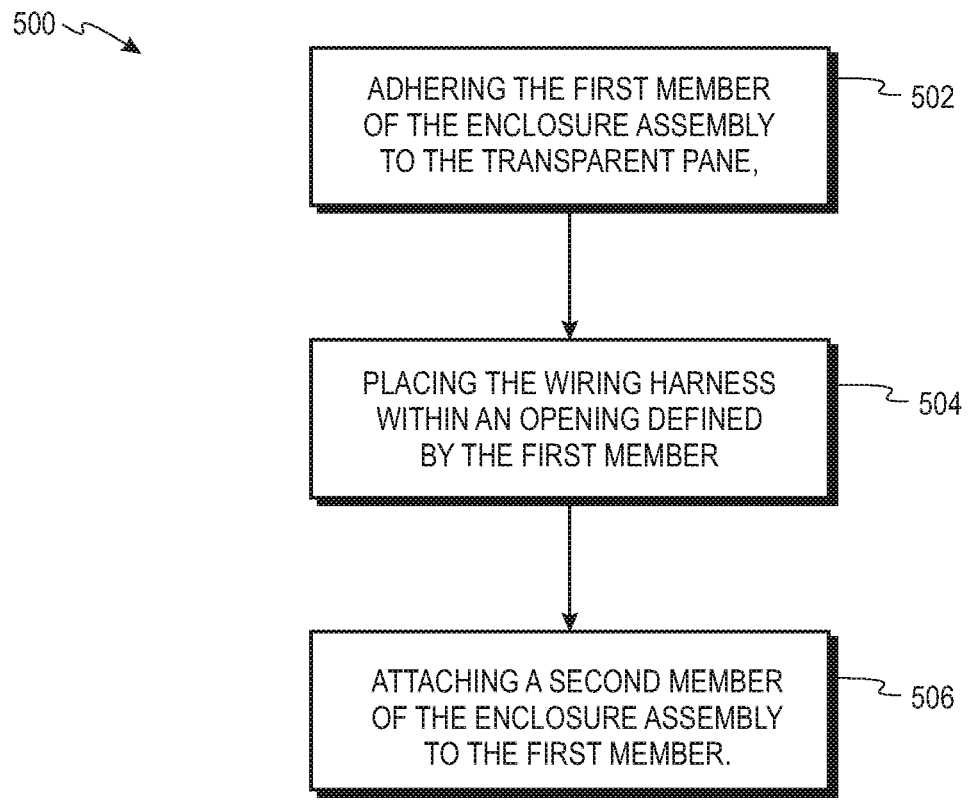
FIG. 5 is a flowchart of a method of assembling an enclosure assembly, according to embodiments of the present disclosure.

FIG. 5 is a method 500 of assembling an enclosure assembly 22 to inhibit a liquid from contacting an electrical joint 24 formed between the electrical conductor 20 and the wiring harness 16. The method 500 includes adhering 502 the first member 26 of the enclosure assembly 22 to the transparent pane 18 such that the electrical conductor extends from the transparent pane 18 through a bore 43 in the first member 26, placing 504 the wiring harness 16 within a first portion 42 of an opening 32 defined by the first member 26 and securing the wiring harness to the electrical conductor 20 to form the electrical joint 24, and attaching 506 a second member 28 of the enclosure assembly 22 to the first member 26. A fluidic barrier is formed between the opening 32 and the wiring harness 16 to inhibit ingress of water into the internal volume defined by the first member 26, the second member 28, and the transparent pane 18.

Figure 6:
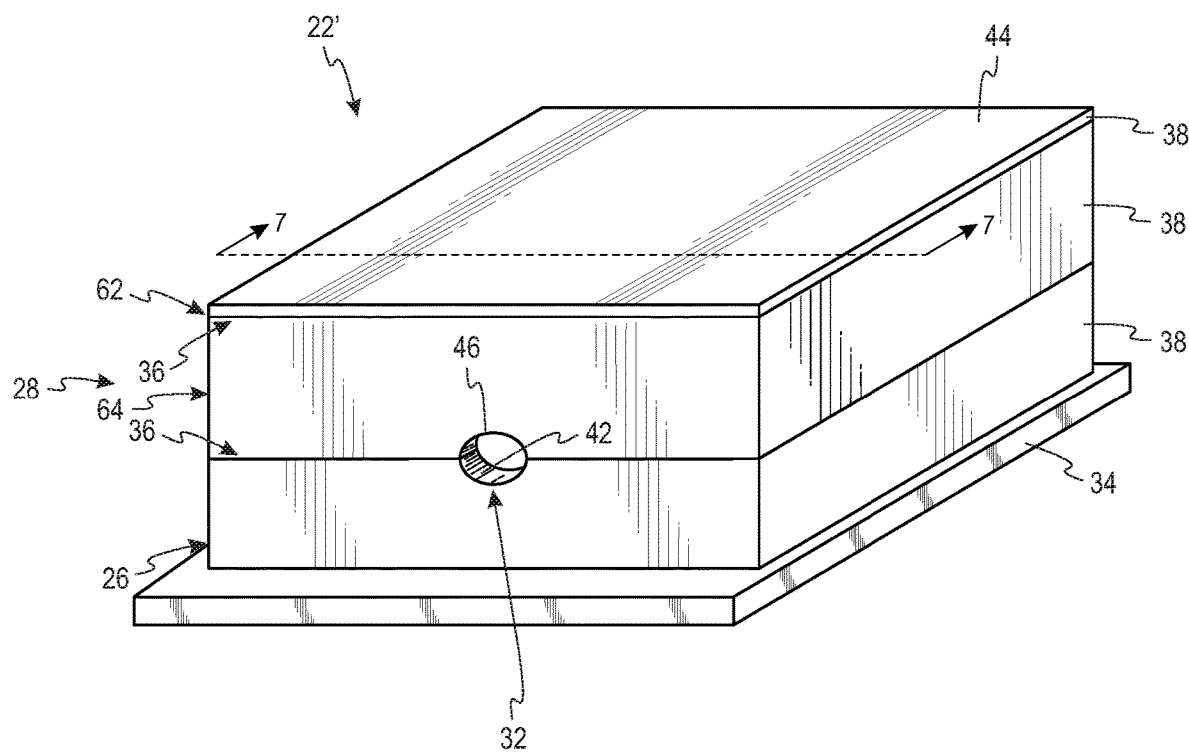
FIG. 6 is a schematic front elevational view of an enclosure assembly for use in the window assembly of FIG. 1 according to further embodiments of the present disclosure.

FIG. 6 is a schematic front elevational view of the enclosure assembly 22' according to further embodiments of the present disclosure. The enclosure assembly 22' includes the first member 26 and the second member 28. The second member 28 of the enclosure assembly 22' includes an upper component 62 and a lower component 64. The lower component 64 defines the second portion 46 of the opening 32. The upper component 62 of the second member 28 is attached to the lower component 64, and the lower component 64 of the second member 28 is attached to the first member 58.

Figure 7:
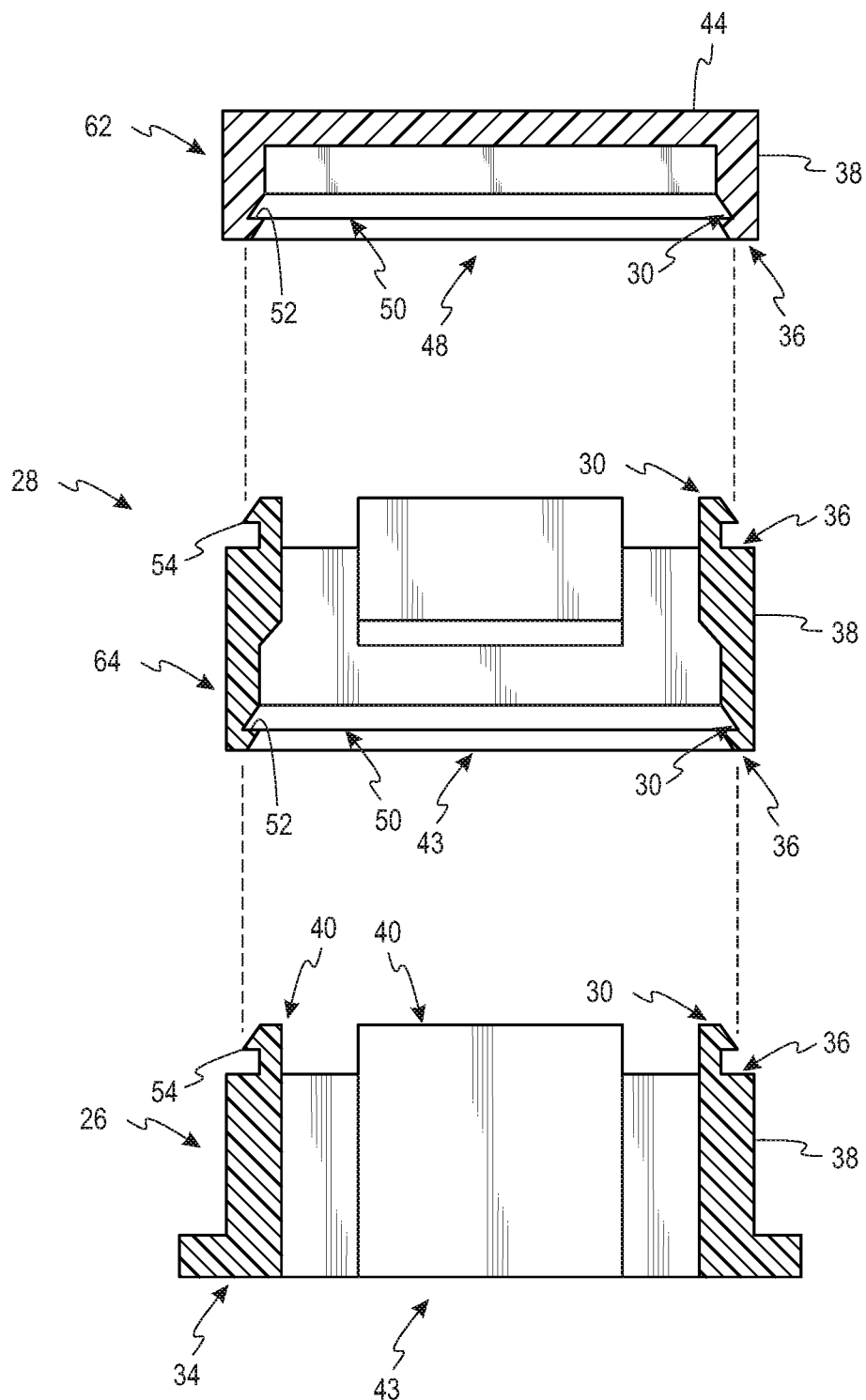
FIG. 7 is a schematic cross-sectional end view of the enclosure assembly of FIG. 6, taken along line 7-7.

In the illustrated figures, as best seen in FIG. 7, the upper component 62 of the second member 28, the lower component 64 of the second member 28, and the first member 26 are attached with mechanical interlocks 30. In some embodiments, an adhesive is used to attach the components in addition to or in place of the mechanical interlocks. Each of the first member 26 and the lower component 64 of the second member 28 define respective bores 43 therethrough. The upper component 62 of the second member 28 defines the open cavity 48.

The enclosure assembly 22' can provide a user with access to the volume after the first portion 42 and the second portion 46 of the opening 32 engage the respective portions of the wiring harness 16. This allows bonds such as electrical joints 24 and bonded portions of the wiring harness 16 to be formed by the user after the wiring harness 16 is engaged. Bonding components within the volume after engaging the wiring harness with the enclosure assembly 22' reduces or eliminates any stress on the electrical joints 24 that may arise during engagement of the wiring harness 16, thereby increasing longevity of the electrical joints 24.

Figure 8:
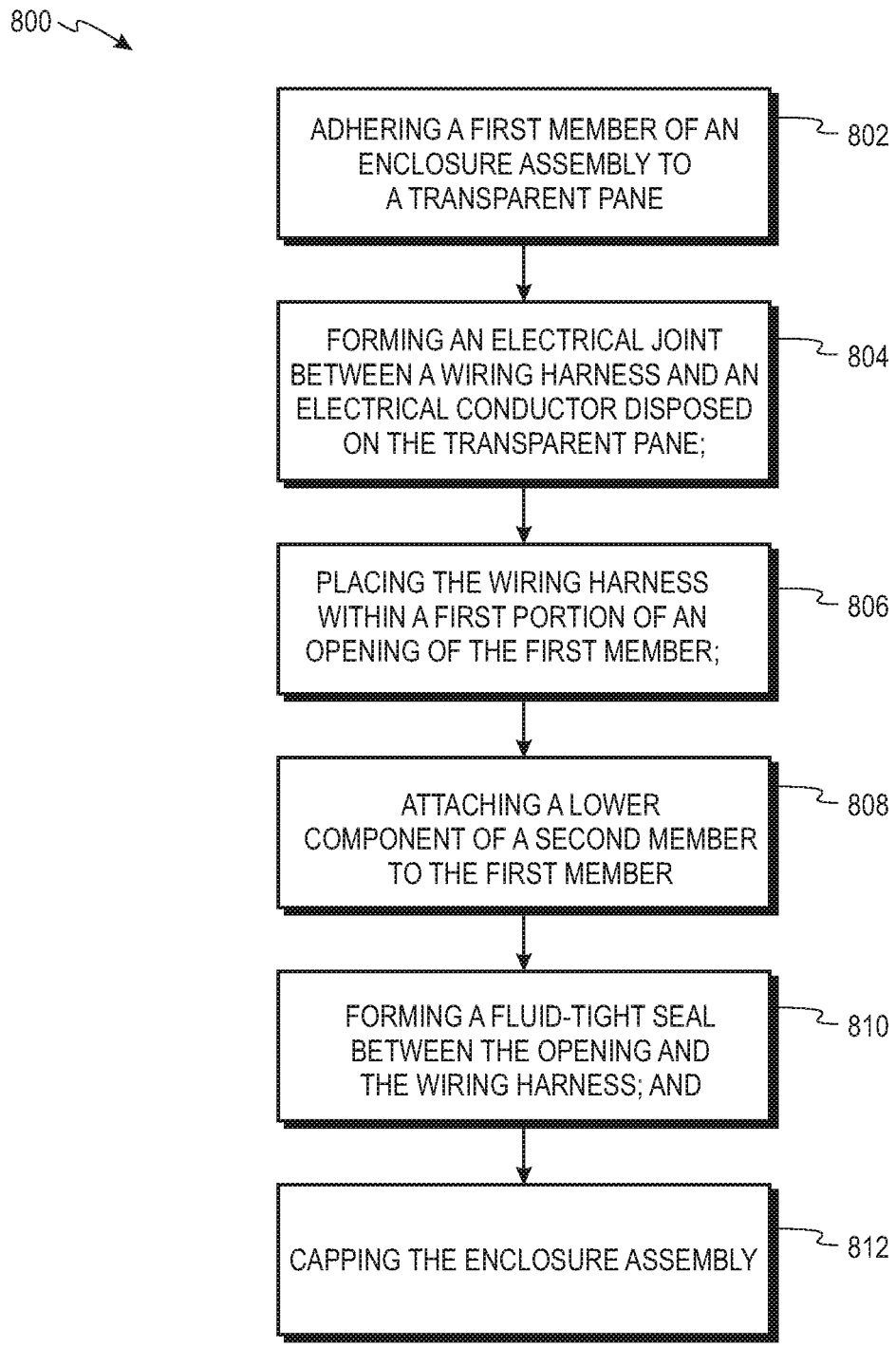
FIG. 8 is a flowchart of a method of assembling an enclosure assembly, according to further embodiments of the present disclosure.

FIG. 8 is a method 800 of environmentally sealing an electrical joint 24 disposed on the transparent pane 18. The method 800 includes adhering 802 the first member 26 of the enclosure assembly 22' to the transparent pane 18, forming 804 the electrical joint 24 between the wiring harness 16 and the electrical conductor 20 disposed on the transparent pane 18, placing 806 the wiring harness 16 within the first portion 42 of the opening 32, attaching 808 the lower component 64 of the second member 28 to the first member 26, forming 810 the fluid-tight seal between the opening 32 and the wiring harness 16, and capping 812 the enclosure assembly 22' with the upper component 62 of the second member 28 to define the internal volume between the enclosure assembly 22' and the transparent pane 18. The first member 26 defines the first portion 42 of the opening 32 for engaging the wiring harness 16. The lower component 64 defines the second portion 46 of the opening 32. The fluid-tight seal is formed in response to attaching the lower component 64 of the second member 28 to the first member 26. The internal volume includes the electrical conductor 20 and the electrical joint 24 therein.

In some embodiments, the volume is filled with a fluidic sealing material (not shown) as described in the '970 Applications. The sealing material covers at least a portion of the terminal connector 58 to provide a secondary barrier against fluids or other corrosive agents from contacting the electrical joint 24. Depending on the application and specific arrangement of components, the sealing material may either be an electrically conductive material or an electrically insulating material. In some embodiments, the electrically insulating material is selected from the group consisting of silicone, room-temperature vulcanization silicone, flexibilized epoxies, urethane, butyl, dielectric grease, and combinations thereof.

In some embodiments, the sealing material is a curable material that is flexible after curing. In some embodiments, the sealing material is a viscous fluid, such as a dielectric grease, which remains substantially within the volume over time. Regardless, it is desirable that the fluidic sealing material has sufficient viscosity to prevent the material from leaking out of the enclosure 22 after assembly (i.e., if any small openings exist), though sufficient fluidity to resist imparting stresses from the enclosure 22 or thermal expansion to the electrical joint 24.

In some embodiments, the sealing material may be applied about the electrical joint 24 prior to attaching the second member 28 to the first member 26. For example, if the walls of the first member 26 are sufficiently tall, the entire first member 26 may be filled with the sealing material. In another embodiment, a fill port may be provided in the top member 44 to permit the sealing material to be injected/filled into the internal volume of the enclosure 22 after assembly. In still other embodiments, the sealing material is provided within the second member prior to assembly, and is configured to generally deform to cover the electrical connection element 56 concurrent with attachment of the second member 28 to the first member 26.

In some embodiments, the internal volume may include a second electrical connection element therein. In some embodiments, the second electrical connection element may be attached to a second wire extending outside the internal volume. In this dual-connection configuration, the sealing material may additionally cover a second electrical joint between the second electrical connection element and a second electrical conductor disposed on the transparent pane 18.

In some embodiments, the transparent pane 18 further includes a ceramic coating thereon. In some embodiments, the enclosure assembly 22 is adhered to the ceramic coating. Optionally, an adhesion promoter or primer can be placed between the ceramic coating and adhesive 40 to improve bonding with the enclosure 30.

Systems and methods in accordance with the present disclosure may provide window assemblies 12 and electrical joints 24 that are more robust than window assemblies 12 and electrical joints 24 that do not inhibit ingress of water to the electrical joints. While engagement of the wiring harness 16 with the enclosure assembly 22 may transfer some stress to the electrical joint because of differences in coefficients of thermal expansion, it may also operate as a strain relief, thus providing more benefits than drawbacks. Regardless, the resulting window assembly is less prone to failure because water-catalyzed corrosion and weakening of the electrical joint is prevented.

While the best modes for carrying out the disclosure have been described in detail, those familiar with the art to which this disclosure relates will recognize various alternative designs and embodiments for practicing the disclosure within the scope of the appended claims.

The invention claimed is:

1. A window assembly comprising:
a transparent pane including glass;
an electrical conductor disposed on the transparent pane;
a wiring harness configured to energize the electrical conductor;
an electrical joint between the wiring harness and the electrical conductor; and
a mechanically protective enclosure assembly adhered to the transparent pane to define an internal volume therebetween, wherein the electrical joint is disposed within the internal volume and spaced from the enclosure assembly, the enclosure assembly including:
a first member having a transparent-pane engaging surface, a first interface surface, and a plurality of first walls extending therebetween, the transparent-pane engaging surface being adhered to the transparent pane,
a second member attached to the first member, the second member including a top member, a second interface surface, and a plurality of second walls extending therebetween, the first interface surface engaging the second interface surface to provide a first fluid-tight seal, and
an opening at least partially defined by at least one of the plurality of second walls, the opening engaging the wiring harness to provide a second fluid-tight seal therebetween, the first fluid-tight seal and the second fluid-tight seal providing a fluidic barrier about the electrical joint.

2. The window assembly of claim 1, wherein the opening is further defined by at least one of the plurality of first walls.

3. The window assembly of claim 1, wherein the transparent-pane engaging surface is adhered to the transparent pane using structural bonding tape.

4. The window assembly of claim 1, wherein the second member is attached to the first member via a mechanical interlock.

5. The window assembly of claim 1, wherein the second member includes an upper component and a lower component, the upper component includes the top member, the lower component defines a portion of the opening, and the upper component is configured to be attached to the lower component after the portion of the opening engages the wiring harness.

6. The window assembly of claim 1, further comprising a grommet disposed between the wiring harness and the opening.

7. The window assembly of claim 1, further comprising a sealing material filling at least a portion of the internal volume, the sealing material providing a fluidic environmental barrier about the electrical joint.

8. The window assembly of claim 1, wherein the electrical conductor consists essentially of silver.

9. The window assembly of claim 1, wherein the electrical conductor includes a plurality of conductive layers.

10. The window assembly of claim 1, wherein the transparent-pane engaging surface is adhered to the transparent pane using a pressure-sensitive adhesive.

11. A method of environmentally sealing an electrical joint disposed on a transparent pane, the method comprising:
adhering a first member of an enclosure assembly to the transparent pane including glass, the first member defining a first portion of an opening for engaging a wiring harness;
placing the wiring harness within the first portion of the opening;
attaching a second member of the enclosure assembly to the first member, the second member defining a second portion of the opening for engaging the wiring harness; and
forming, in response to attaching the second member to the first member, a fluidic barrier between the opening and the wiring harness to inhibit ingress of water into a volume defined by the first member, the second member, and the transparent pane,
wherein the volume includes an electrical joint disposed therein, an electrical conductor is disposed on the transparent pane, and the electrical conductor is coupled to the wiring harness through the electrical joint.

12. The method of claim 11, wherein the first portion is attached to the transparent pane using structural bonding tape or a pressure-sensitive adhesive.

13. The method of claim 11, wherein the second member is attached to the first member via a mechanical interlock.

14. The method of claim 11, further comprising filling at least a portion of the volume with a sealing material, the sealing material covering the electrical joint.

15. The method of claim 11, wherein the electrical conductor consists essentially of silver.

16. A method of environmentally sealing an electrical joint disposed on a transparent pane, the method comprising:
adhering a first member of an enclosure assembly to the transparent pane, the first member defining a first portion of an opening for engaging a wiring harness;
forming the electrical joint between the wiring harness and an electrical conductor disposed on the transparent pane;
placing the wiring harness within the first portion of the opening;

attaching a lower component of a second member to the first member, the lower component defining a second portion of the opening;

forming, in response to attaching the lower component of the second member to the first member, a fluid-tight seal between the opening and the wiring harness; and capping the enclosure assembly with an upper component of the second member to define an internal volume between the enclosure assembly and the transparent pane, the internal volume including the electrical conductor and the electrical joint therein.

17. The method of claim 16, wherein forming the electrical joint occurs after attaching the lower component of the second member to the first member.

18. The method of claim 16, wherein the lower component is attached to the first member via a first mechanical interlock, and wherein the lower component is capped by the upper component via a second mechanical interlock.

19. The method of claim 16, further comprising filling at least a portion of the internal volume with a sealing material, the sealing material covering the electrical joint.

20. The method of claim 16, wherein the electrical conductor consists essentially of silver.

* * * * *